United States Patent [19]

Goodwin

[11] Patent Number: 4,658,204
[45] Date of Patent: Apr. 14, 1987

[54] ANTICIPATORY POWER FAILURE DETECTION APPARATUS AND METHOD

[75] Inventor: Peter A. Goodwin, Wayland, Mass.

[73] Assignee: Prime Computer, Inc., Natick, Mass.

[21] Appl. No.: 827,366

[22] Filed: Feb. 7, 1986

[51] Int. Cl.$^4$ ............................................. G05F 1/46
[52] U.S. Cl. .................................. 323/285; 323/299; 361/18; 361/92
[58] Field of Search ............... 323/282, 283, 284, 285, 323/288, 299; 340/660, 661, 663; 361/18, 86, 92, 187, 189, 190

[56] References Cited

U.S. PATENT DOCUMENTS

| | | | |
|---|---|---|---|
| 4,414,598 | 11/1983 | Nowell | 323/285 X |
| 4,439,805 | 3/1984 | Tarleton | 361/92 |
| 4,517,618 | 5/1985 | Frank | 323/285 X |
| 4,535,410 | 8/1985 | O'Mara | 361/92 X |
| 4,594,517 | 6/1986 | Cohen et al. | 361/92 X |

*Primary Examiner*—Peter S. Wong

*Attorney, Agent, or Firm*—Lahive & Cockfield

[57] ABSTRACT

An anticipatory power failure detection apparatus and method, for use in connection with power supplies providing a regulated voltage signal to an electronic load such as a computer, employing circuitry for determining whether a control signal, within the regulated power supply circuit, is in a saturation state. Upon detecting a saturation state for the control signal, circuitry signals that an input power failure is occurring. The regulated power supply system can be a switching-type voltage regulation control system, wherein a pulse-width modulated switching system controls the periodic input of energy to an energy-storage network which generates the regulated voltage output signal. A derivative of the error signal is periodically sampled for determining whether it is in the saturation state. The regulated power supply control signal will be in the saturation state when the unregulated input voltage supply is insufficient to maintain the regulated voltage signal at the specified optimum operating point.

9 Claims, 3 Drawing Figures

FIG. 1 *(PRIOR ART)*

ANTICIPATORY POWER FAILURE DETECTION APPARATUS AND METHOD

BACKGROUND OF THE INVENTION

The invention relates generally to the detection and reporting of a power failure, and more particularly, to a method and apparatus for anticipating the loss of power at a load prior to the time at which the power failure at the load has deleterious effects upon equipment performance.

Electronic equipment, for example electronic computers, have always been particularly sensitive to the power-on and power-off sequences to which their components are subjected. During the power-on sequence, for example, a computer must be held in a static, initial condition, until its power source has become stable. Similarly, during the power-off sequence, the computer must be constrained to prevent unpredictable operation, or corruption or distortion of stored information.

Of all of the power failure conditions to which electronic equipment can be subjected, the loss or degradation of DC power to a computer's circuits is perhaps the most traumatic. That loss or degradation of power, if not detected promptly and dealt with accordingly, can adversely affect not only ongoing computations, but can further cause changes in, or loss of, memory. In either instance, there can be a severe interruption to the computation process even after the power has been restored.

Accordingly, therefore, most sophisticated electronic devices provide for a regulated power supply in which the voltage applied to the electronic circuitry, the load, is continuously monitored to avoid changes in the voltage applied to the load, even though the input voltage to the equipment, the line voltage power source, may vary by, for example, twenty percent. These regulated voltage power supplies, which can be for example of the switching-type, thus typically monitor the load voltage to detect a power failure. However, by the time the circuitry detects the occurrence of a power failure, there is very little time available to take the necessary steps to prevent the power failure from potentially causing a major interruption to the processing being performed by the electronic circuitry.

Accordingly, therefore, an object of the present invention is a method and apparatus which enables the power failure detection circuitry to anticipate the occurrence of a power failure at the load, thereby providing additional time for the equipment to react to the power failure, and therefore avoid the likelihood of severe unpredictable disruptions to signal processing and to allow normal resumption of the processing when power is restored. Other objects of the invention are a method and apparatus for detecting a power failure which are reliable, which are simple in circuit implementation, which adjust automatically to degradation of components in the voltage regulation circuitry, and which can be adapted to equipment with substantially little modification of the existing circuitry.

SUMMARY OF THE INVENTION

The invention relates generally to an apparatus and method for anticipating an input power failure condition in a regulated power supply system having a regulated output signal. The apparatus features circuitry for generating a regulation control signal representative of the difference between the regulated output signal and an optimum operating point output signal (called the "set point"); circuitry responsive to the control signal for generating the regulated output signal; circuitry for determining when the control signal is in a saturated state; and circuitry for signalling an input power failure at a time when the control signal is in the saturated state.

In a particular embodiment of the invention, the apparatus features a switching-type voltage regulation control system having a voltage regulation monitoring circuitry for generating an error signal representative of the difference between a regulated voltage output of the power supply system and the set point. The switching signal generating circuitry responds to the error signal by controlling the periodic input of energy to an energy-storage network, across whose output terminals the regulated voltage appears; and circuitry is further provided for periodically sampling the control signal for signalling a power failure condition at a time when the control signal is in the saturation condition.

The method of the invention features the steps of generating a regulation control signal representative of the difference between the regulated output signal and the set point; using the control signal for generating the regulated output voltage; determining when the control signal is in a saturation state; and signalling an input power failure if the control signal is in the saturated state.

In a particular aspect of the invention, the method features the steps of generating an error signal representing the difference between the set point voltage and the actual regulated voltage output of a voltage power supply system; generating, in response to the error signal, a switching control signal for controlling the periodic energy input to an energy-storage network, across whose output terminals the regulated voltage appears; and periodically sampling the switching control signal for signalling a power failure condition at a time when the control signal is in a saturation condition.

BRIEF DESCRIPTION OF THE DRAWINGS

Other objects, features, and advantages of the invention will appear from the following description of a preferred embodiment of the invention taken together with the drawings in which.

DESCRIPTION OF A PREFERRED EMBODIMENT

Figure 1:
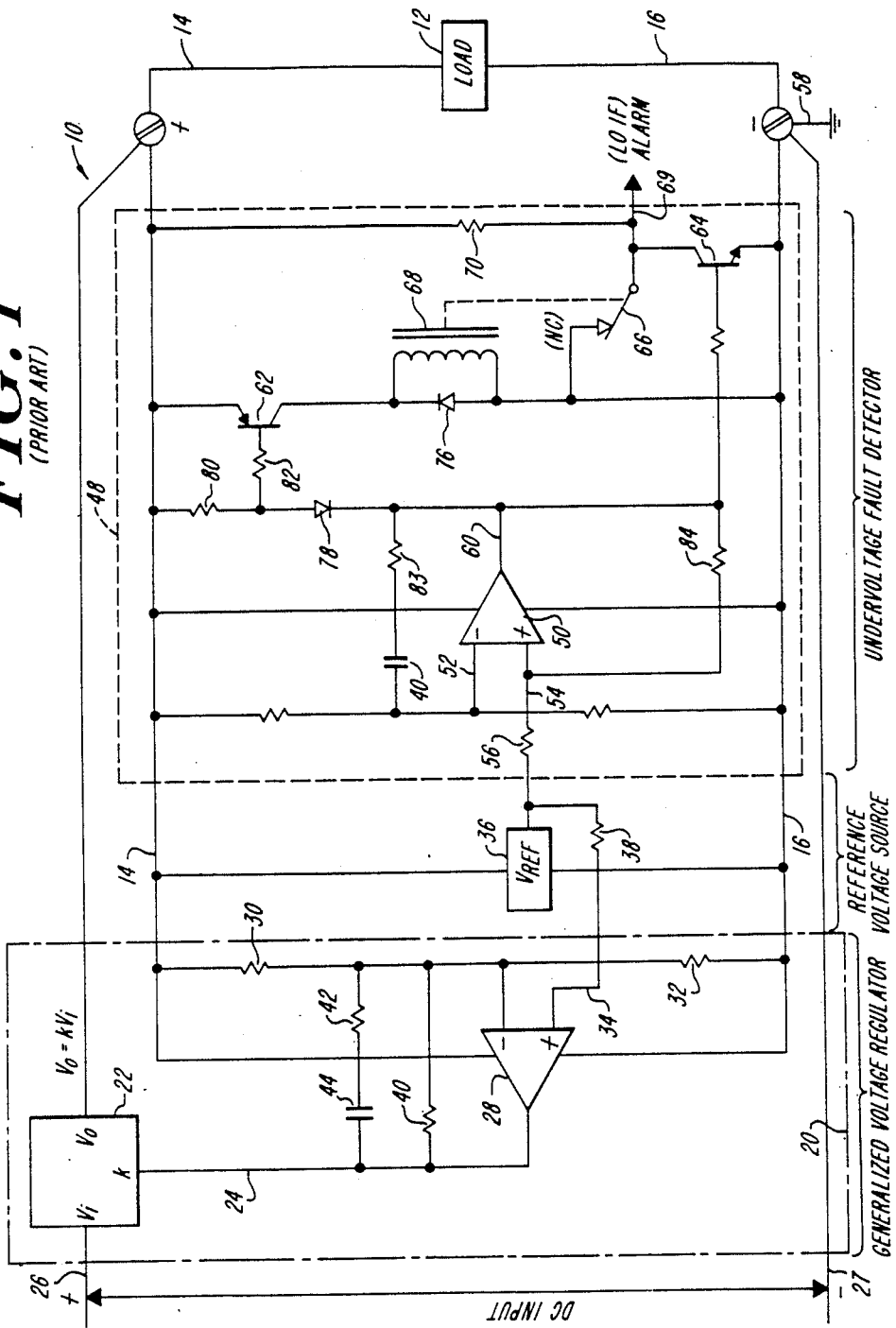
FIG. 1 is an electrical schematic diagram of a typical voltage apparatus according to the prior art.

Referring to FIG. 1, a regulated voltage power supply 10 applies a regulated D.C. voltage output signal to a load 12 over lines 14 and 16. The regulator system 10 has a voltage regulation control system 20, which utilizes negative feedback derived from a sample of the output voltage, to control the voltage being delivered to the load. In the illustrated embodiment, a control block 22, in response to a developed feedback error control signal "k", over a line 24, exerts the necessary control so that the regulated output voltage, $V_o$, will be a function of "k" acting upon an unregulated input voltage $V_i$ applied between lines 26 and 27. Thus, in accordance with the illustrated embodiment of the invention, the output voltage $V_o$, is related to the input voltage, $V_i$, in accordance with the equation:

$$V_o = k \cdot V_i$$

where $0 < k \leq 1$.

The error signal "k" on line 24 is, in accordance with the illustrated embodiment, representative of the difference between the regulated output voltage and the set point for that output voltage. The error control signal is generated by an amplifier 28 which provides a measure of the difference between a representation of the output voltage $V_o$ between lines 14 and 16, scaled by a resistance divider formed from resistors 30 and 32 and a reference input. That second input to the comparator amplifier 28 is a reference voltage over a line 34 from a reference source 36. The reference voltage from source 36 is provided through a compensating resistor 38 and represents the set point for the regulation system.

The gain of the control system amplifier 28 is set by resistors 30 and 32, in combination with a negative feedback resistor 40, and a complex feedback impedance formed by a resistor 42 and a capacitor 44. The complex impedance provides a low pass characteristic with predictable gain degradation as a function of passband, as is well known in the art. In the illustrated embodiment, the input voltage $V_i$ is greater than the output voltage $V_o$ (although this is not a necessary condition in other embodiments, as is well known in the art) and therefore an increase in the output voltage $V_o$, as measured on line 14 relative to line 16, produces a decrease in the error voltage on line 24. An unwanted increase in the output voltage thus causes a decrease in the value of "k", which, in turn, acts to reduce, and therefore correct, the output voltage $V_o$.

One form of power failure detection, which is well known in the art, detects when the load voltage decreases below a set reference threshold. This power failure detection can be implemented, as illustrated by the regulation monitoring circutry 48 in FIG. 1, using an amplifier 50 which monitors, over a line 52, a scaled measurement of the DC potential ($V_o$) between lines 14 and 16, relative to a reference potential on a line 54 from the reference source 36 through a resistor 56. So long as the power supply is operating within preset voltage limits, the potential on line 52 is more positive than the reference potential available over line 54, relative to a system ground 58; and therefore, the voltage output from amplifier 50 over a line 60 is near ground potential. In this state, base current flows out of a PNP transistor 62 and an NPN transistor 64 is turned off. Accordingly, an armature 66 of a relay 68 is transferred to an open position, and the alarm signal over a line 69 is pulled toward the positive line 14 through a resistor 70.

If the potential difference between lines 14 and 16 decreases to a point whereby the potential on line 52 is more negative than the reference potential on line 54, the output of amplifier 50 over line 60 changes state, rising toward the positive line 14, thereby turning off the transistor 62 and turning on transistor 64. This action in turn pulls the alarm line 69 toward ground, signalling a fault condition. Since transistor 62 is now off, no voltage is impressed onto the coil of relay 68. It therefore drops its armature and provides a metallic conductor connection between the alarm line 69 and system ground.

In accordance with this implementation of a prior art voltage monitoring circuit, a diode 76 protects transistor 62 when it turns off; a diode 78 ensures that transistor 62 can be turned off by a resistor 80; and a resistor 82 limits, to a safe value, the base current which can be drawn from transistor 62. A positive feedback resistor 84 of amplifier 50 sets the DC hysteresis of the amplifier, and the complex negative feedback of a resistor 88 and a capacitor 90 provides the filtering necessary to make the amplifier 50 insensitive to ordinary and expected transient voltages on the DC lines 14, 16. Such transient voltages might be generated by an abrupt change in load current by the load 12. Also, the relay contacts of armature 66 guarantee that the alarm line 69 will be in a predictable state when the power supply regulation section 20 is reactivated. Finally, transistor 64 covers that time duration during which the armature 66 is transferring to its normally closed condition and provides for any bounce which may occur.

Figure 2:
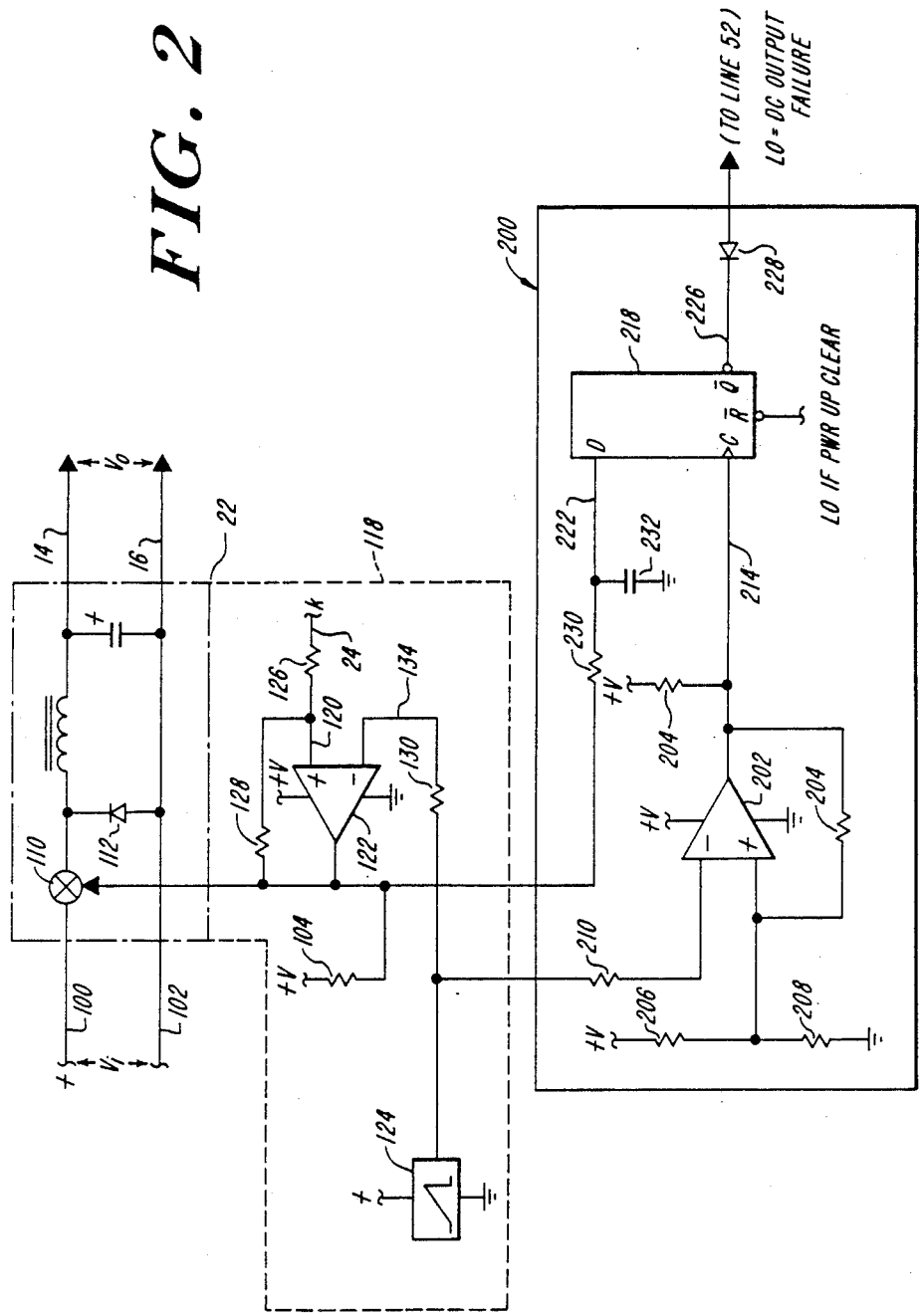
FIG. 2 is an electrical schematic diagram of a switching-type voltage control with an anticipatory power failure detection circuit in accordance with the invention.

In accordance with the illustrated embodiment of the invention, there is provided an anticipatory power failure detector 200 which anticipates a reduction of the voltage signal level on the DC bus output, lines 14 and 16, as a result of an input power failure. In the illustrated embodiment, the anticipatory power failure detector is implemented as an extension to existing switching-type voltage-regulation control circuitry. Thus, in accordance with the preferred embodiment, the control block is a switching-type voltage regulation control system. Referring to FIG. 2, the switching-type voltage regulator 22 receives an uncontrolled source of DC input voltage over lines 100, 102 and modulates the input voltage in accordance with an on/off control signal available over a line 104. A generalized switching element 110 which can be, for example, a voltage controlled transistor switch, and a diode 112 which acts as a free-wheeling diode, switchably connect the input voltage $V_i$ to an energy-storage network, being an LC filter circuit in the illustrated embodiment, having an inductor 114 and a capacitor 116. In effect, switch 110, when closed, allows energy to be stored in the filter circuit. The output of the control block 22 is the controlled output voltage $V_o$ between lines 14 and 16. (The diode 112 allows the current flowing through inductor 114 to continue flowing when the switch 110 turns off.)

A pulse width modulator section 118 of control block 22 provides the control signal output over line 104 for controlling the switch element 110. The error signal "k" over line 24 controls the output of the voltage regulator and is used as a comparison argument input, over a line 120, to a comparator amplifier 122. The other argument input to the comparator 122 is a ramp signal generated by a sawtooth generator 124, of which there are many types known in the art. Resistors 126 and 128 provide a small amount of hysteresis to the voltage comparator 122 to ensure rapid and positive switching. A resistor 130 provides thermal stability. The amplifier 122 generates a "high" output for the control signal over line 104 whenever the error signal over line 120 exceeds the instantaneous value of the sawtooth output from source 124 over a line 134. In the illustrated embodiment, this high signal turns switch 110 on, delivering energy to inductor 114. The result is that the voltage output $V_o$ across capacitor 116 will begin to increase. Thus, consistent with the circuit description in FIG. 1, the error signal "k", and hence the average signal level on line 120, vary in a relative direction which is opposite to the desired change in output voltage $V_o$. That is, for example, referring to FIG. 3, if the output voltage is too high, "k", and hence the duration of the high state on line 104 (the "on time" of switch 110) decrease, thereby reducing $V_o$ to a corrected lower value. Conversely, the pulse width modulated signal output of amplifier 122 over line 104 has a high output level which increases in duration when the voltage output $V_o$ is less than required. In this manner, the voltage output is controlled for a switching-type regulator system.

Referring again to FIG. 2, the anticipatory regulation circuitry of the preferred embodiment of the invention is employed in connection with the control block 22 and employs the same conditions which are used to maintain the proper regulated voltage to detect an input power failure. Since the same signals are used, any variations in those signals due to, for example, tolerances, aging, or environmental conditions, are automatically corrected and adjusted because they exist inside the regulator feedback loop to which the anticipatory power failure detector is connected. In accordance with the illustrated embodiment of the invention, the anticipatory voltage failure detection circuitry 200 has a comparator 202 which is configured, using a positive feedback resistor 204, to act as a Schmidt trigger. Resistors 206 and 208, in the illustrated embodiment, are of equal value. A resistor 209 acts as a pull-up resistor and a resistor 210 adds thermal stability to the circuit. In the illustrated embodiment, the function of the comparator 202 and its associated circuitry is to convert the sawtooth waveform output of sawtooth generator 124 to a square wave signal, over a line 214, suitable to clock a flip-flop 218. While in the illustrated embodiment of the invention the square wave is symmetrical (see FIG. 3), it need not be so, so long as it provides a trigger edge substantially contemporaneous in time to the downward or return edge of the sawtooth signal, for example at 220 (FIG. 3).

In the illustrated embodiment of the invention, the falling edge 220 of the sawtooth waveform gives rise thus to a rising edge over line 214. A latch, the "D"-type flipflop 218, will record and store a DC failure condition when the signal level on line 222 is high at the same time that there exists a low-to-high transition over line 214. The latch 218 produces an output (Q̄) signal level over a line 226 which, in its low state, represents a DC power failure. A diode 228 connects the output of latch 218 to the alarm generating signal circuitry, and in particular, at line 52, the negative input of comparator amplifier 50. Thus, the circuitry 200 generates an alarm condition using existing alarm generating circuitry. A resistor 230 and a capacitor 232 generate a short delay in series with the input to the latch 218 from line 104, if required.

Figure 3:
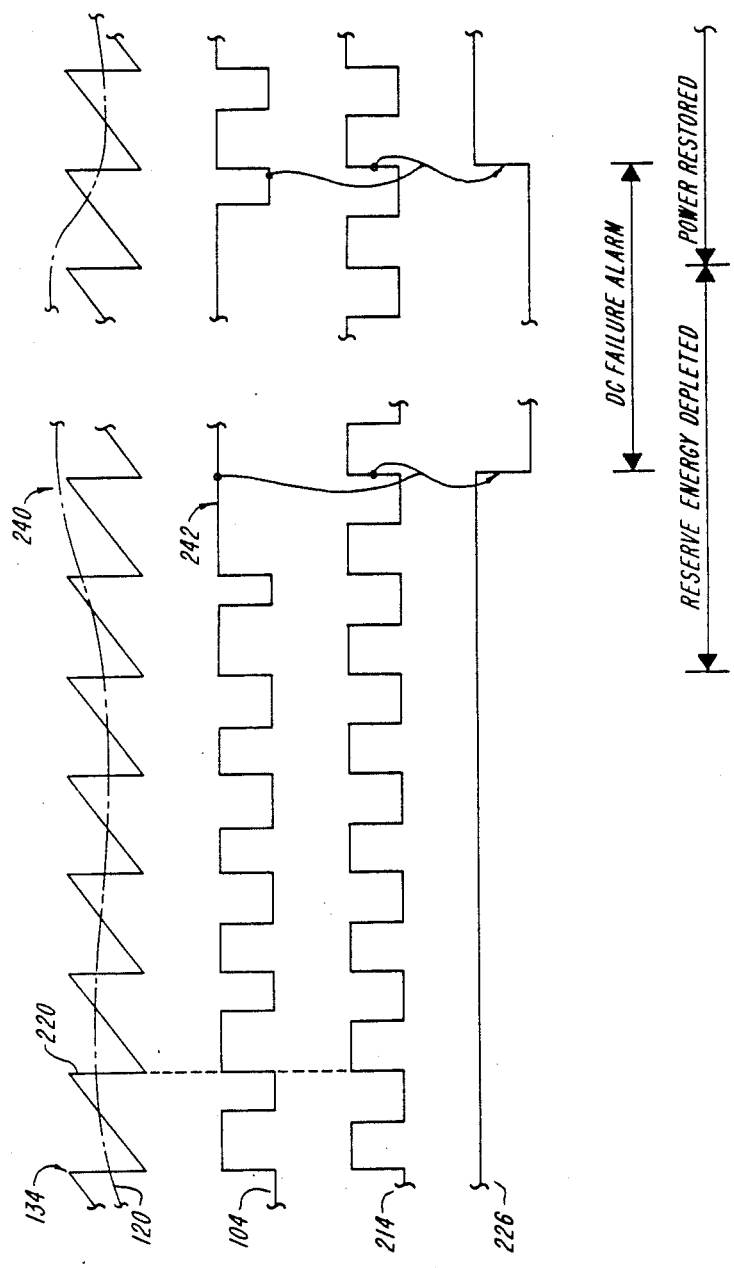
FIG. 3 illustrates the signals on several conductors of the circuit embodiment of FIG. 2 in accordance with the preferred embodiment of the invention.

Accordingly, therefore, referring to FIG. 3, when the control signal over line 120 rises so that it no longer intersects the ramp sawtooth, (at 240) the output of comparator 122 stays high, (at 242) at a time when the ramp signal over line 134 transitions in a negative direction. This combination of events represents a saturation condition of the voltage error control signal; that is, a condition wherein the control signal signals, at its peak limit, the need for a higher output voltage which however the regulation circuitry cannot provide. The error signal in effect saturates and cannot change further to increase the output voltage. In accordance with that high output condition from comparator amplifier 122, the upward transition from the comparator 202 over line 214 latches the high signal level into the flipflop 218, causing a low output over line 226, indicating an alarm condition. This is in anticipation of the change in voltage occurring between lines 14 and 16. The change of voltage at the output, $V_o$, typically would not have been detected by comparator amplifier 50. Accordingly, therefore, in anticipation of the voltage change about to occur at the load 12, the anticipatory power failure detection circuitry 200 provides the alarm signal necessary to ensure the successful preservation of data and operations in the electronic circuitry represented by load 12. When the voltage returns to a normal regulation condition, the output of flipflop 218 transitions to a high level and the alarm condition is accordingly removed.

In particular, the invention need not be practiced solely with switching-type voltage regulation equipment but may be further included in any other equipment wherein a saturation condition of the voltage power supply regulation system control signal can be monitored. Accordingly, additions, subtractions, deletions, and other modifications of the claimed invention will occur to those practiced in the art and are within the scope of the following claims.

What is claimed is:

1. An apparatus for anticipating a power failure condition in a regulated power supply system having a regulated output signal comprising means for generating a regulation control signal representative of the difference between said regulated output signal and an optimum operating point of the regulated output signal, means responsive to said control signal for generating said regulated output signal, means for determining when said control signal is in a saturation state, and means for signalling an input power failure if said control signal is in said saturated state.

2. An apparatus for anticipating a power failure condition in a regulated voltage power supply system having a regulated voltage output signal comprising a switching-type voltage regulation control system, said system having a voltage regulation monitor means for generating an error signal representing the difference between a regulated voltage output of said power supply system and an optimum operating point voltage output, and switching signal generating means responsive to said error signal for generating a control signal for controlling periodic input of energy to an energy-storage network of said regulation control system for generating said regulated voltage output, and means for periodically sampling said control signal for signalling a power failure condition at a time when said error signal is in a saturation state.

3. The apparatus of claim 2 wherein said switching-type voltage regulation control system further comprises means for generating a reference signal from said regulated voltage output for providing said optimum operating point voltage output, means for generating a pulse width modulated control signal in response to said error signal, voltage controlled switching means, responsive to said pulse width modulated signal, for controlling the periodic energy input to said energy-storage network, and said sampling means further comprising means for periodically sampling said pulse width modulated signal for signalling said power failure condition representing said error signal being in a saturation state.

4. The apparatus of claim 3 wherein said switching-type voltage regulation control system further comprises sawtooth signal generating means, said pulse width modulated signal generating means being responsive to said sawtooth signal generator output signal and to said error signal derived from said regulated output voltage of the power supply system for generating said pulse width modulated output signal, and said sampling means comprising means for deriving a sampling time pulse signal to occur contemporaneously with and responsive to a return transition of said sawtooth wave signal for sampling said pulse width modulated output signal at about the time of occurrence of said return transition, said sampled output indicating a saturated condition in said pulse width modulated signal when said pulse width modulated signal does not return to a switch cut-off state at said sample time.

5. A method for anticipating a power failure condition in a regulated power supply system having a regulated output signal comprising the steps of generating a regulation control signal representative of the difference between said regulated output signal and an optimum operating point of the output signal, using said control signal for generating said regulated output signal, determining when said control signal is in a saturation state, and signalling an input power failure if said control signal is in said saturated state.

6. A method for anticipating a power failure condition in a regulated voltage power supply system having a regulated voltage output signal comprising the steps of generating an error signal representing the difference between an optimum operating point output voltage and the regulated voltage output of said voltage power supply system, generating, in response to said error signal, a switching control signal for controlling a periodic energy input to an energy-storage network of a switching-type voltage regulation control system for generating said regulated voltage output, and periodically sampling said switching control signal for signalling a power failure condition at a time when said error signal is in a saturation state.

7. The method of claim 6 further comprising the steps of generating a reference signal from said regulated voltage output for providing said optimum operating point voltage output, generating a pulse width modulated control signal in response to said error signal, controlling in response to said pulse width modulated signal, the periodic energy input to said energy-storage network, and periodically sampling said pulse width modulated signal for signalling said power failure condition when said error signal is in a saturation state.

8. The method of claim 7 further comprising the steps of generating a sawtooth wave signal, generating, in response to said sawtooth signal and to the error signal derived from said regulated output voltage of the power supply system, said pulse width modulated output signal, deriving a sampling time pulse signal to occur contemporaneously with and responsive to a return transition of said sawtooth wave signal for sampling said pulse width modulated output signal at said return time, and signalling a power failure condition when said sampled output indicates a saturation state in said error signal wherein said pulse width modulated signal does not return to a switch cut-off state at said sample time.

9. An apparatus for anticipating a power failure condition in a regulated power supply system having a regulated output signal comprising means for generating a regulation control signal representative of the difference between said regulated output signal and an optimum operating point of the regulated output signal, means responsive to said control signal for generating said regulated output signal, means for determining when said control signal is in a saturation state, a relay having a relay coil and at least one set of contacts, a first transistor in series with said relay coil, said coil and said transistor being connected across a power source, means for connecting a normally closed contact of said set to a source of power, a second transistor connected between said source of power and an armature contact of said set, and means responsive to said determining means for activating, in a first no-alarm condition, said first transistor to a conductive state for actuating said relay coil and for maintaining said second transistor in a cut-off condition, and for turning said first transistor, in an alarm condition, to release said coil, and for activating said second transistor for applying said source voltage to signal an input power failure when the control signal is in the saturated state.

* * * * *